Patented Apr. 3, 1928.

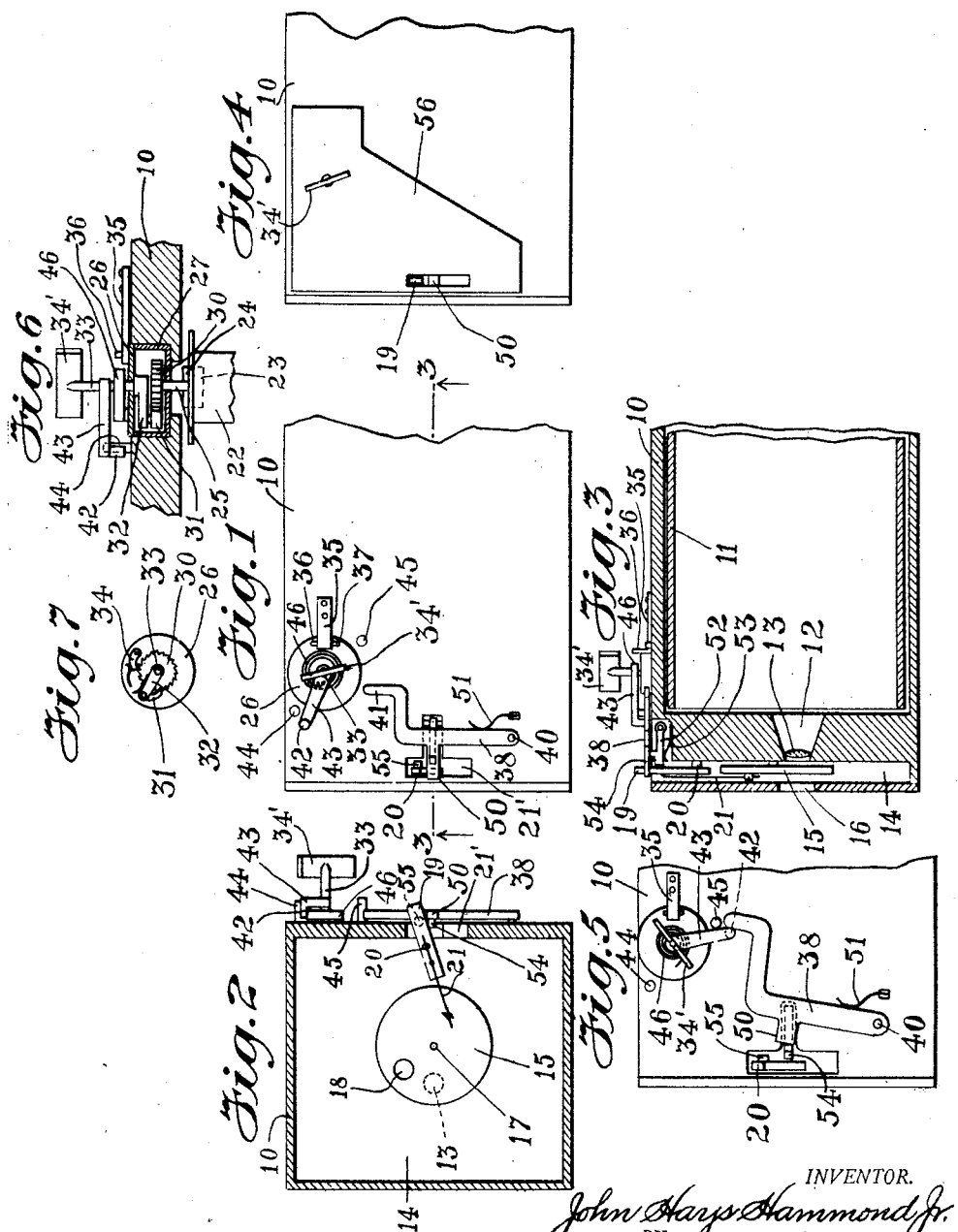

1,664,550

UNITED STATES PATENT OFFICE.

JOHN HAYS HAMMOND, JR., OF GLOUCESTER, MASSACHUSETTS.

SHUTTER-CONTROL MECHANISM.

Application filed January 21, 1921. Serial No. 438,865.

Some of the objects of the present invention are to provide an improved camera; to provide a camera having means to prevent more than one exposure being made upon a film or plate; to provide means for automatically locking the shutter of a camera at substantially the completion of an exposure; to provide means operable by the film winding mechanism of a camera for cooperating with a shutter device for releasing the shutter for operation in the usual manner; and to provide other improvements as will hereinafter appear.

In the accompanying drawings, Fig. 1 represents a plan of a portion of a camera equipped with one form of the present invention; Fig. 2 represents a transverse section of the same; Fig. 3 represents a section on line 3—3 of Fig. 1; Fig. 4 represents a plan of the camera with the operating parts concealed by a suitable closure; Fig. 5 represents the parts, shown in Fig. 1, in another position; Fig. 6 represents a sectional detail of the film winding mechanism and its adjuncts; and Fig. 7 represents a detail of the winding ratchet.

Referring to the drawings, one form of the present invention is shown as applied, by way of example, to a box camera of well known construction, comprising a box 10 arranged to receive a film-holding receptacle 11 in telescopic relation. The receptacle 11 has an open end disposed toward the front of the box 10, and the box 10 is provided with an opening 12 having a lens 13 therein whereby images are projected within the film receptacle 11. The front of the camera box 10 is also provided with a compartment 14 in which a shutter 15 is located and arranged to normally intercept light from an opening 16 to the lens 13. The shutter 15 is pivoted at 17 and has an opening 18 therethrough which is arranged to register with the opening 16 to thereby admit light rays to the lens 13.

For shifting the shutter 15 from one position to another, whereby the film is instantaneously exposed, a lever 19 is pivoted at 20 to the box 10 and carries a spring member 21 which is connected at its free end to the shutter 15 in such relation to the pivot 17 as to rapidly throw the shutter 15 to a new position whenever the lever 19 is shifted. This lever 19 projects through a slot 21' in the box 10 to bring it to a convenient operating position and each throw thereof causes the shutter 15 to uncover the lens 13 and expose a film.

For the purpose of winding the film a winding spool 22, of the usual form, is provided having the customary slot 23 in one end to receive a tongue 24 which is fast to a rotatable spindle 25 projecting from and snugly journalled in a portion of a casing 26, this last being seated in a shouldered recess 27 in the box 10. The spindle 25 has a ratchet wheel 30 fast thereon which is arranged to be driven by a spring pressed pawl 31 pivoted upon an arm 32 rigidly carried by a shaft 33. A second spring pressed pawl 34 is pivoted upon the casing 26 in a position to engage the ratchet wheel 30 and thereby hold the wheel 30 against reverse turning. The shaft 33 fits snugly but rotatably in the casing 26 and terminates in a thumb piece 34' for manual operation.

In order to release the film spool 22 for replacement the casing 26 is arranged to slide with respect to the box 10 and axially with the shaft 33 to thus withdraw the tongue 24 from the slot 23. A flat spring strip 35 is made fast at one end to the box 10 and has its free end overlapping the top of the casing 26 so that the parts are returned to their normal position with the tongue 24 interfitting with the winding spool 22. This spring strip 35 also abuts two pins 36 and 37 which are rigid with the casing 26, the said strip 35 resting between the pins 36 and 37 to prevent turning movement of the casing 26.

For the purpose of locking the shutter lever 19 to prevent its operation until an unexposed film length has been brought into position, an arm 38 is pivoted to the box 10 at 40 and has a laterally disposed finger 41 extending into the path of movement of a lug 42 secured to a trip arm 43 which is fast to the shaft 33 and moves angularly within limits defined by two suitably spaced pins 44 and 45, both fixed to the box 10 and at opposite sides respectively of the arm 43 but in the path of movement thereof. The trip arm 43 is arranged to be returned to its normal position after each movement by spring action imparted from a coiled spring 46 which is secured at one end to the shaft 33 and at the other end to the top of the casing 26. The arm 38 is provided with a projection 50 arranged to be brought into the path of the lever 19 at certain times for locking purposes by the action of a spring 51. The box 10 is suitably recessed below the projection 50 to receive a pivoted detent 52 which is normally pressed toward the projection 50 by a spring 53 and serves to hold the arm 38 in unlocking position at certain times. The detent 52 has an extension 54 projecting into the path of movement of a cam lug 55 fixed to the lever 19, so that as the lever 19 swings across the end of the detent 52, the lug 55 rides over the extension 54 and thereby releases the arm 38 to swing under the action of the spring 51.

A suitable cover plate 56 is provided to conceal the working parts, while providing access to the shutter arm 19 and the film winding thumb piece 34'.

In the operation of the invention the camera is loaded in the usual manner and when the receptacle 11 containing the new film is inserted, the thumb piece 34' is pulled up, thus moving the casing 26 against the action of the spring strip 35 and withdrawing the tongue 24 from the path of the film receptacle 11 until the latter is in position when the thumb piece 34' is allowed to return the parts to normal position under the action of the spring strip 35 and the tongue 24 fits in the slot 23 in the film spool 22 in a well known manner. The parts are now in the position shown in Fig. 1.

In order to bring the first film into position, the thumb piece 34' is given an oscillating motion, which, by means of the pawl 31 and ratchet wheel 30, rotates the tongue 24, thus winding up the film. The rotation of the thumb piece 34' in a counter-clockwise direction swings the trip arm 43 in a counter-clockwise direction so that the lug 42 engages the arm 38 and rotates the latter in a clockwise direction until the detent 52 springs over the end of the projection 50, thus holding the arm 38 in the position shown in Fig. 5. The motion of the thumb piece 34' is continued until the film is turned to the first position, as indicated by the numbers on the film protector, which is visible through an opening in the back of the camera. When the thumb piece 34' is released the trip arm 43 is returned to the position shown in Fig. 1 by the spring 46, though without affecting the position of the film because the pawl 31 merely slides over the ratchet wheel 30, while the latter is held by the pawl 34.

When it is desired to take a picture, the lever 19 is swung to one side and causes the shutter 15 to expose the first film. During the movement of the lever 19 the cam lug 55 engages the extension 54 of the detent 52, thus swinging the latter to release the arm 38 which moves under the action of the spring 51 to the position shown in Fig. 1. It is now impossible to take a picture because the projection 50 is in the path of the shutter lever 19. When, however, the film is turned to a new position by actuating the thumb piece 34', the lug 42 on the trip arm 43 again engages the arm 38 and moves it to the position shown in Fig. 5 as above described. This allows the shutter lever 19 to be operated and a second picture can be taken on the second film. As soon as the lever 19 has been moved for taking the second picture, the arm 38 will be again returned to the locking position and such sequence of operations will continue until the full roll of film has been exposed, thus preventing the taking of a picture until the previously exposed film has been wound out of position.

Although only a single form is shown in which this invention may be embodied, it is to be understood that the invention is not limited to any specific construction, but might be applied in various forms without departing from the spirit of the invention or the scope of the appended claims.

Having thus described my invention, I claim:

1. In a camera, the combination of a shutter, a pivoted lever for operating said shutter, a pivoted locking arm having its free end movable into the path of movement into the shutter lever for effectively preventing the operation of said shutter lever, a detent to hold the locking lever inoperative, said detent having an extension, a cam lug carried by the shutter lever for engaging the extension of the detent during the operation of the shutter lever thereby releasing the locking lever, an oscillatory feeding mechanism for light sensitive material, a trip member arranged to be operated by said feeding mechanism for moving the locking lever into unlocking position, and a yielding element for retaining the locking lever in locked position.

2. In a camera, the combination of a shutter, a lever for operating said shutter, a locking lever pivoted near one of its ends and so that the other end projects in one of its positions into the path of movement of said shutter operating lever, a yielding element for maintaining the locking lever in its locking position, a detent for latching the locking lever into unlocking position, said detent being unlatched by operation of the shutter lever, an oscillatory feeding mechanism for light sensitive material including an arm, a spring engaging said arm, said arm being arranged to engage the locking lever to move the locking lever into unlocking position.

Signed at New York, in the county of New York, and State of New York, this 12 day of January A. D. 1920.

JOHN HAYS HAMMOND, Jr.